(12) United States Patent
Lee et al.

(10) Patent No.: US 8,016,610 B1
(45) Date of Patent: Sep. 13, 2011

(54) BATTERY CONNECTOR FOR A MOBILE TERMINAL

(75) Inventors: Hyunho Lee, Gyeonggi-Do (KR); Taeyoon Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/970,606

(22) Filed: Dec. 16, 2010

(30) Foreign Application Priority Data

Jun. 28, 2010 (KR) .................. 10-2010-0061475

(51) Int. Cl.
*H01R 3/00* (2006.01)
(52) U.S. Cl. ........................ 439/500; 439/660
(58) Field of Classification Search .............. 439/500, 439/660
See application file for complete search history.

(56) References Cited

U.S. PATENT DOCUMENTS

| | | | | |
|---|---|---|---|---|
| 6,129,582 | A * | 10/2000 | Wilhite et al. | 439/500 |
| 6,537,081 | B2 * | 3/2003 | Lai et al. | 439/66 |
| 6,568,956 | B1 * | 5/2003 | Holmberg | 439/500 |
| 7,150,637 | B2 * | 12/2006 | Ohmori et al. | 439/147 |
| 7,374,452 | B2 * | 5/2008 | Kohri et al. | 439/500 |
| 7,404,733 | B2 * | 7/2008 | Jeon | 439/500 |

* cited by examiner

*Primary Examiner* — Gary F. Paumen
(74) *Attorney, Agent, or Firm* — Lee, Hong, Degerman, Kang & Waimey

(57) ABSTRACT

A mobile terminal includes a battery having at least one contact pad that has a first pad portion and a second pad portion positioned on adjacent surfaces of the battery. A connecting device configured to electrically couple the battery to a terminal body includes an electrically conductive flexible terminal having first and second contact portions biased to contact the first and second pad portions of the battery. The mobile terminal also includes an insulation mount configured to support the flexible terminal. One end of the flexible terminal is coupled to the insulation mount and the other end of the flexible terminal is free. The flexible terminal is configured to increase contact pressure of the second contact portion against the second pad portion of the battery when force is applied to the first contact portion of the flexible terminal in a direction away from first pad portion of the battery.

22 Claims, 10 Drawing Sheets

: Direction of Force

⇨ : Direction of Force

BATTERY CONNECTOR FOR A MOBILE TERMINAL

RELATED APPLICATION

Pursuant to 35 U.S.C. §119(a), this application claims the benefit of earlier filing date and right of priority to Korean Application No. 10-2010-0061475, filed on Jun. 28, 2010, the contents of which is incorporated by reference herein in its entirety.

FIELD OF THE INVENTION

The present invention relates to a battery connecting structure for a portable mobile terminal.

DESCRIPTION OF THE RELATED ART

Portable mobile terminals can be carried easily and can perform one or more function, such as supporting voice and video telephony calls, inputting and/or outputting information or storing data incorporated therein. As mobile terminals have become multifunctional, many can be used to capture still images or moving images, play music or video files, play games or receive broadcasts, thus they are implemented as integrated multimedia players.

Various new attempts have been made in terms of hardware or software for mobile terminals having multimedia capabilities in order to implement such complicated functions. As an example, a user interface environment is provided so that users may easily and conveniently retrieve or select functions.

A rechargeable battery is mounted within a mobile terminal to supply power to the mobile terminal. The battery is detachable to facilitate its replacement. For this purpose, a connecting structure between a battery and a mobile terminal is provided to electrically couple the battery to the mobile terminal. The coupling structure is typically configured with a terminal having a bias to promote contact with the battery to ensure a stable power supply. However, when an external shock is applied to the battery or mobile terminal, the bias force of the terminal may be instantaneously and momentarily separated from the contact state with the battery due to the inertia of such external shock, thereby causing the mobile terminal to enter an "off" condition.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The foregoing object and configuration of a mobile terminal according to the present invention will be more clearly understood through the detailed description of the preferred embodiments thereof based on the drawings attached hereto.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile terminal associated with the present invention will be described in more detail with reference to the accompanying drawings. A suffix "module" or "unit" used for constituent elements disclosed in the following description is intended merely for easy description of the specification, and the suffix itself does not give any special meaning or function.

A mobile terminal disclosed herein may include a portable phone, a smart phone, a palmtop/laptop computer, a digital broadcast terminal, a personal digital assistant (PDA), a portable multimedia player (PMP), a portable gaming device, a MP3 player, an e-book, a navigation device, and other similar devices.

Figure 1:
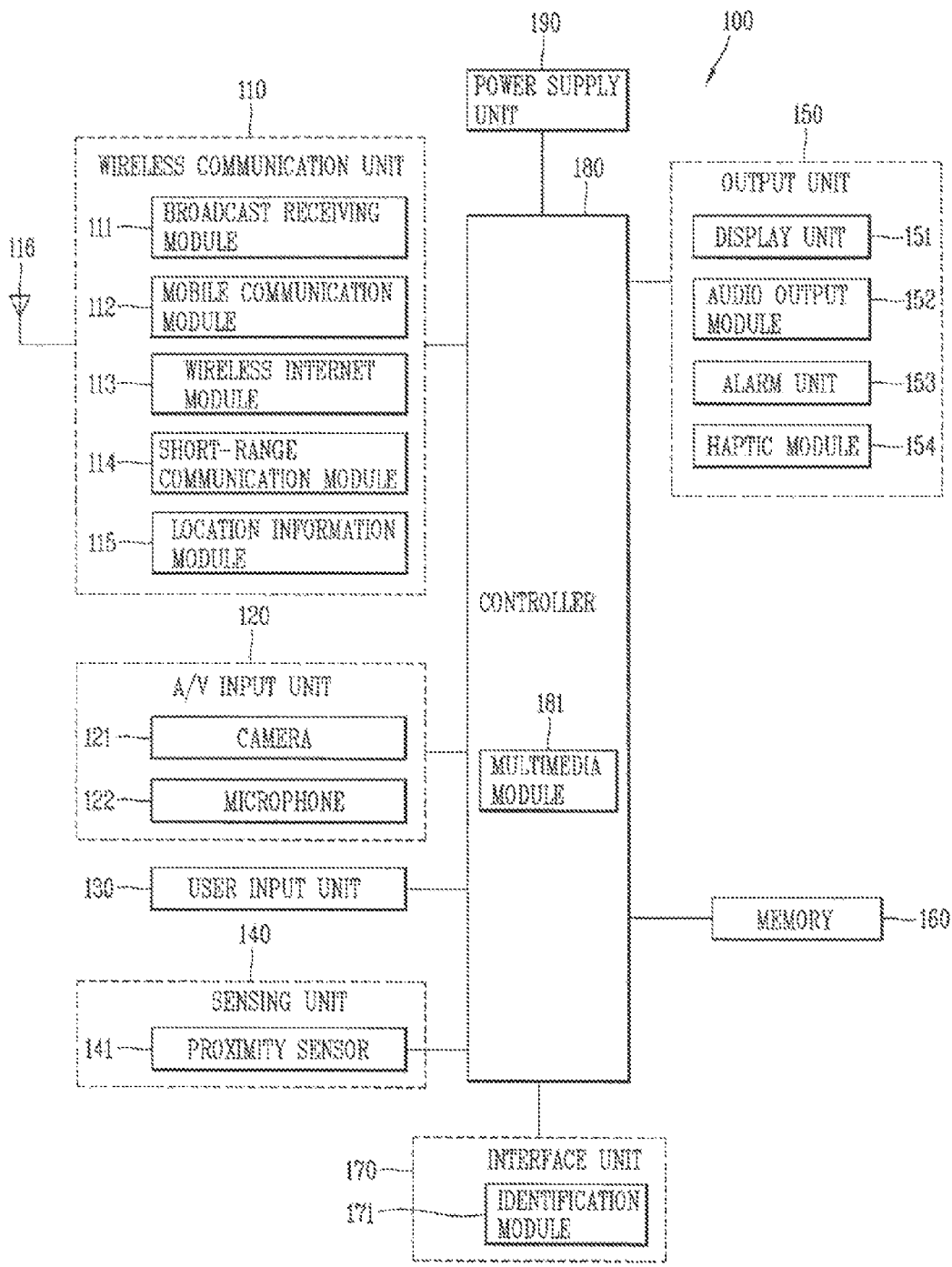
FIG. 1 is a block diagram illustrating a mobile terminal according to an embodiment of the present invention.

FIG. 1 is a block diagram illustrating a mobile terminal according to an embodiment of an embodiment of the present invention. The mobile terminal 100 may include a wireless communication unit 110, an Audio/Video (NV) input unit 120, a user input unit 130, a sensing unit 140, an output unit 150, a memory 160, an interface unit 170, a controller 180 and a power supply unit 190. However, the constituent elements as illustrated in FIG. 1 are not necessarily required and the mobile terminal may be implemented with more or fewer elements than the listed elements. Hereinafter, the constituent elements will be described in sequence.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114 and a location information module 115.

The broadcast receiving module 111 receives broadcast signals and/or broadcast associated information from an external broadcast management server through a broadcast channel. The broadcast channel may include a satellite channel and/or a terrestrial channel. The broadcast management server may refer to a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form of a data broadcast signal coupled to the TV or radio broadcast signal.

The broadcast associated information may refer to information regarding a broadcast channel, a broadcast program, a broadcast service provider, or other broadcast associated information. The broadcast associated information may also be provided through a mobile communication network, in which case the broadcast associated information may be received by the mobile communication module 112.

The broadcast associated information may exist in various forms. For example, the broadcast associated information may exist in the form of an electronic program guide (EPG) of digital multimedia broadcasting (DMB), electronic service guide (ESG) of digital video broadcast-handheld (DVB-H), or other forms that are well known in the art.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO®), digital video broadcast-handheld (DVB-H), or integrated services digital broadcast-terrestrial (ISDB-T). The broadcast receiving module 111 is configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal or a server over a mobile communication network. The radio signal may include a voice call signal and/or various types of data signals according to text and/or multimedia message transmission and/or reception.

The wireless Internet module 113 is a module for supporting wireless Internet access. The wireless Internet module 113 may be built into the mobile terminal or installed externally to the mobile terminal 100. The wireless Internet module may use a wireless Internet access technique including a WLAN (Wireless LAN), Wi-Fi®, Wibro® (Wireless Broadband), Wimax® (World Interoperability for Microwave Access) or HSDPA (High Speed Downlink Packet Access), to name a few.

The short-range communication module 114 is a module for supporting a short-range communication. The short-range communication module 114 may utilize a short-range communication technology, such as Bluetooth®, Radio Frequency IDentification (RFID), Infrared Data Association (IrDA), Ultra WideBand (UWB) or ZigBee®, to name a few.

The location information module 115 is a module for checking or acquiring a location of the mobile terminal. One representative example of the location information module 115 is a Global Positioning System (GPS) module.

With continuing reference to FIG. 1, the A/V (audio/video) input unit 120 receives an audio or video signal. The A/V (audio/video) input unit 120 may include a camera 121 and a microphone 122. The camera 121 processes an image frame, such as a still picture or a video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the environment in which the mobile terminal is used.

The microphone 122 receives an external audio signal through a microphone when the mobile terminal 100 is in a phone call mode, a recording mode, a voice recognition mode, or other voice receiving mode, and processes the audio signal into electronic voice data. The processed voice data may be converted and output into a format that is transmittable to a mobile communication base station through the mobile communication module 112 in the phone call mode. The microphone 122 may implement various types of noise canceling algorithms to cancel noise generated during a procedure of receiving the external audio signal.

The user input unit 130 may generate input data to control an operation of the mobile terminal 100. The user input unit 130 may be configured to include a keypad, a dome switch, a touch pad (pressure/capacitance), a jog wheel, a jog switch, or other user input device that is well known in the art.

The sensing unit 140 detects a current status of the mobile terminal 100 such as an opened or closed state of the mobile terminal 100, a location of the mobile terminal 100, or an orientation of the mobile terminal 100, and generates a sensing signal for controlling the operation of the mobile terminal 100. For example, when the mobile terminal 100 is a slide-type phone, the sensing unit 140 may sense an opened or closed state of the slide-type phone. Furthermore, the sensing unit 140 performs a sensing function associated with whether or not power is supplied from the power supply unit 190, or whether or not an external device is coupled to the interface unit 170. The sensing unit 140 may include a proximity sensor 141.

The output unit 150 is configured to provide an output for audio signal, video signal, or alarm signal. Accordingly, the output unit 150 may include the display unit 151, an audio output module 152, an alarm unit 153, a haptic module 154, or other output device that is well known in the art.

The display unit 151 may display or output information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or a GUI.

The display unit 151 may include at least one of a Liquid Crystal Display (LCD), a Thin Film Transistor-LCD (TFT-LCD), an Organic Light Emitting Diode (OLED) display, a flexible display or a three-dimensional (3D) display. The display unit 151 may be configured with a transparent or optical transparent display to allow viewing of the exterior of the mobile terminal 100 through the display unit, which may be called a transparent display. An example of a typical transparent display may include a transparent LCD (TOLED) or other transparent display that is well known in the art. Under this configuration, a user can view an object positioned at a rear side of a terminal body through a region occupied by the display unit 151 of the terminal body.

The display unit 151 may be implemented to include two or more displays according to a configured aspect of the mobile terminal 100. For example, a plurality of the display units 151 may be arranged on one surface of the mobile terminal 100 and spaced apart from or integrated with each other, or may be arranged on different surfaces of the mobile terminal.

If the display unit 151 and a touch sensitive sensor (referred to as a touch sensor) are formed as an interlayer structure, the structure may be referred to as a touch screen. The display unit 151 having the touch screen configuration may be used as both an input device and an output device. The touch sensor may be implemented as a touch film, a touch sheet, a touch pad, or other touch surface that is well known in the art.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals and transmits corresponding data to the controller 180. Accordingly, the controller 180 may sense which region of the display unit 151 has been touched.

With further reference to FIG. 1, a proximity sensor 141 may be arranged at an inner region of the mobile terminal 100 covered by the touch screen or near the touch screen. The proximity sensor is a sensor that may sense presence or absence of an object approaching toward a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, or other proximity sensor that is well known in the art. When the touch screen is implemented as a capacitance type touch screen, proximity of a pointer to the touch screen is sensed by changes of an electromagnetic field. Accordingly, the touch screen (touch sensor) may be categorized as a proximity sensor.

Hereinafter, for the sake of convenience, a condition where the pointer is positioned proximate the touch screen without contacting the touch screen will be referred to as a 'proximity touch', whereas a situation where the pointer substantially contacts the touch screen will be referred to as a 'contact touch'. The position of the pointer corresponding to the proximity touch on the touch screen, corresponds to a position at which the pointer is perpendicular to the touch screen during the proximity touch of the pointer.

The proximity sensor 141 senses proximity touch and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, a voice recognition mode, a broadcast reception mode, etc. The audio output module 152 may output audio signals relating to functions performed in the mobile terminal 100, e.g., sounding an alarm when a call is received, when a message is received, etc. The audio output module 152 may include a receiver, a speaker, a buzzer, or other audio output component that is well known in the art.

The alarm unit 153 outputs signals notifying the occurrence of events from the mobile terminal 100. The events occurring from the mobile terminal 100 may include a call received, a message received, a key signal input, a touch input, and so on. The alarm 153 may output not only video or audio signals, but also other types of signals such as signals notifying the occurrence of events via a vibration. Since the video or audio signals can be output through the display unit 151 or the audio output module 152, the display unit 151 and the audio output module 152 may be categorized as a part of the alarm unit 153.

The haptic module 154 generates various tactile effects that a user can feel, such as a vibration. Vibration generated by the haptic module 154 may have a controllable intensity, a controllable pattern, or other controllable features. For example, different vibration patterns may be output in a synthesized manner or in a sequential manner.

The haptic module 154 may generate various tactile effects, including not only vibration, but also an arrangement of pins moving vertically with respect to skin being touched (contacted), air injection force or air suction force through an injection hole or a suction hole, touch by a skin surface, presence or absence of contact with an electrode, effects by stimulus such as an electrostatic force, reproduction of a cold or hot feeling using a heat absorbing device or a heat emitting device, or other haptic effects produced by other haptic effect devices that are well known in the art.

The haptic module 154 may be configured to transmit tactile effects (signals) through a user's direct contact, or a user's muscular sense using a finger or a hand. The haptic module 154 may be implemented to include two or more devices according to the configuration of the mobile terminal 100.

The memory 160 may store a program for the processing and controlling of the controller 180. Alternatively, the memory 160 may temporarily store input/output data (e.g., phonebook data, messages, still images, video, etc.). The memory 160 may also store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, or other storage device that is well known in the art. Also, the mobile terminal 100 may operate a web storage which performs the storage function of the memory 160 on the Internet.

The interface unit 170 may generally be implemented to interface the mobile terminal with external devices. The interface unit 170 may allow data reception from an external device, a power delivery to each component in the mobile terminal 100, or data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, or other interface devices that are well known in the art.

The interface unit 170 may include an identification module 171 configured as a chip for storing various information required to authenticate an authority to use the mobile terminal 100. The identification module may include a User Identity Module (UIM), a Subscriber Identity Module (SIM), or other identification device that is well known in the art. The identification module (hereinafter, referred to as 'identification device') may be implemented in a type of smart card. Hence, the identification device can be coupled to the mobile terminal 100 via a port.

The interface unit 170 may serve as a path for power to be supplied from an external cradle to the mobile terminal 100, when the mobile terminal 100 is connected to the external cradle, or as a path for transferring various command signals input from the cradle by a user to the mobile terminal 100. Such various command signals or power input from the cradle may operate as signals for recognizing that the mobile terminal 100 has been mounted to the cradle accurately.

The controller 180 typically controls the overall operations of the mobile terminal 100. For example, the controller 180 performs the controlling and processing associated with telephony calls, data communications, video calls, and other communications that are well known in the art. The controller 180 may include a multimedia module 181 that provides multimedia playback. The multimedia module 181 may be configured as part of the controller 180 or as a separate component. The controller 180 can perform a pattern recognition processing so as to recognize writing or drawing input on the touch screen as text or image.

The power supply unit 190 provides power required by various components of the mobile terminal 100. The power supply unit 190 operates under the control of the controller 180.

Figure 2:
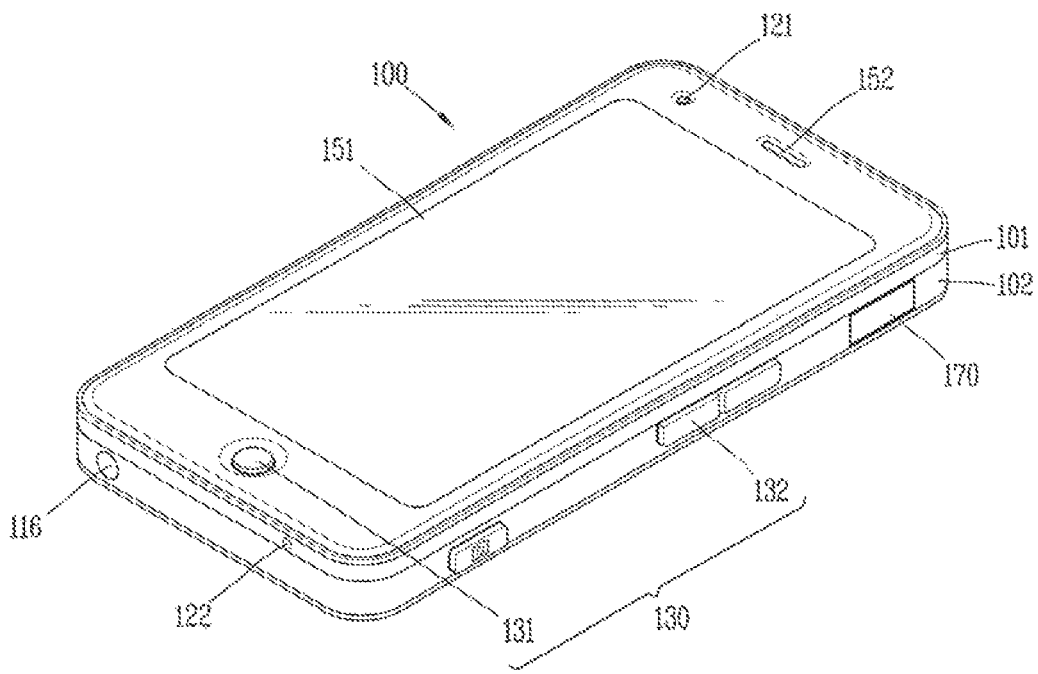
FIG. 2 is a front perspective view illustrating an example of a mobile terminal according to an embodiment of the present invention.

FIG. 2 is a front perspective view illustrating an example of a mobile terminal 100 according to an embodiment of the present invention. The mobile terminal 100 described herein is configured as a bar-type mobile terminal. However, the present invention is not limited to a bar-type mobile terminal, but is also applicable to various types of mobile terminal structures, such as a slide-type, a folder-type, a swivel-type, a swing-type, and other mobile terminal designs that are well known in the art in which two and more bodies are combined with each other in a relatively movable manner.

The terminal body includes a case (casing, housing, cover, etc.) forming an appearance of the terminal. In this embodiment, the case may be divided into a front case 101 and a rear case 102. At least one middle case may be additionally disposed between the front case 101 and the rear case 102. The cases may be formed, for example, by injection-molding a synthetic resin or formed of a metal material such as stainless steel (STS), titanium (Ti), or other appropriate metallic material.

A display unit 151, an audio output module 152, a camera 121, a user input unit 130 (e.g., 131, 132), a microphone 122, an interface unit 170, and other devices may be arranged on the terminal body, such as on the front case 101. The display unit 151 may occupy a majority of the front case 101. The audio output module 152 and the camera 121 are disposed on a region adjacent to one of two ends of the display unit 151, and a first manipulation unit 131 and the microphone 122 are disposed on a region adjacent to the other, opposite end thereof. A second manipulation unit 132 and the interface unit 170, as well as other devices, may be disposed on a lateral surface of the front case 101 and the rear case 102.

The user input unit 130 may be manipulated to receive a command for controlling the operation of the mobile terminal 100 and may include a plurality of manipulation units 131, 132. The manipulation units 131, 132 may be commonly designated as a manipulating portion and any tactile method may be employed to allow the user to perform manipulation with a tactile input.

The content input via the manipulation units 131, 132 may be set in various ways. For example, the first manipulation unit 131 may be used to receive a command, such as start, end or scroll, and the second manipulation unit 132 may be used to receive a command, such as controlling a volume level being output from the audio output module 152 or switching the display unit 151 into a touch recognition mode.

Figure 3:
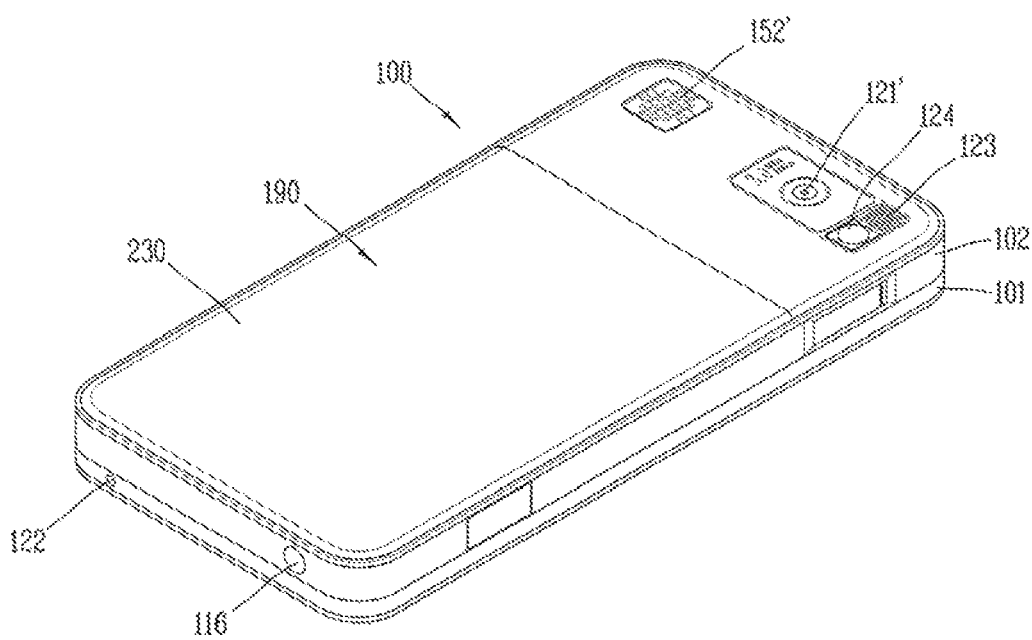
FIG. 3 is a rear perspective view of the mobile terminal illustrated in FIG. 2.

FIG. 3 is a rear perspective view illustrating the mobile terminal 100 illustrated in FIG. 2. Referring to FIG. 3, a second camera 121' may be mounted on a rear surface of the terminal body, namely, the rear case 102. The second camera 121' has an image capturing direction that is substantially opposite to the direction of the camera 121 (FIG. 2) and may have a different resolution than the camera 121.

For example, it may be preferable that the camera 121 has a relatively lower number of pixels to facilitate the user capturing an image of his or her own face to send to another party during a video call, and the second camera 121' may have a relatively greater number of pixels to facilitate the capturing of an image of a general object that is not sent immediately to another party. The camera 121 and the second camera 121' may be provided in the terminal body in a rotatable or pop-up manner.

A flash 123 and a mirror 124 may be disposed adjacent to the second camera 121'. The flash 123 illuminates light toward an object when capturing an image of the object with the second camera 121'. The mirror 124 allows the user to see a reflection of his or her own face when capturing an image of himself or herself (in a self-portrait mode) by using the second camera 121'.

A second audio output module 152' may also be disposed on the rear surface of the terminal body. The second audio output module 152', in conjunction with the audio output module 152 (FIG. 2), can be used to implement a stereo function. The second audio output module 152' may also be used to implement a speaker phone mode during a phone call.

An antenna 116 for receiving broadcast signals may be disposed on a lateral surface of the terminal body. The antenna 116 may constitute a portion of the broadcast receiving module 111 (FIG. 1) and may be configured to be pulled out from the terminal body.

The power supply unit 190 for supplying power to the mobile terminal 100 may be mounted on the terminal body. The power supply unit 190 may be configured so as to be incorporated in the terminal body, or directly detachable from the outside of the terminal body.

Figure 4:
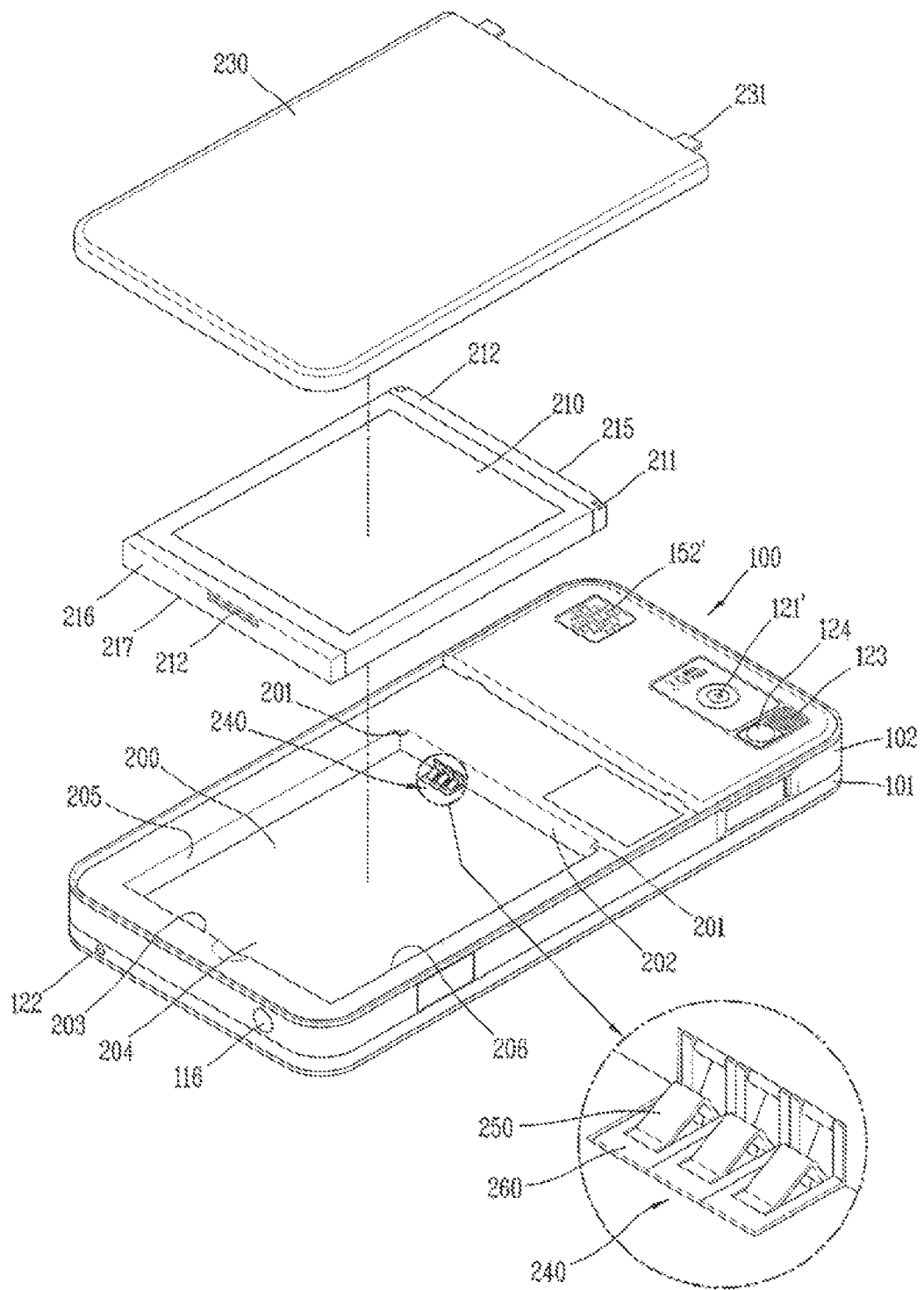
FIG. 4 is a perspective view illustrating a battery cover and a battery separated from a terminal body of the mobile terminal illustrated in FIGS. 2 and 3.

Hereinafter, a connecting device capable of transmitting stable power from a battery to the mobile terminal 100 will be described in more detail. FIG. 4 is a perspective view illustrating a battery and a battery cover of the mobile terminal 100 separated from a terminal body of the mobile terminal to show an example of the connecting structure for electrically coupling the battery to the terminal body.

The mobile terminal 100 may include a battery 210 for receiving power. The battery 210 may be accommodated in a mounting portion, such as battery mounting portion 200 provided on a surface of the mobile terminal 100. The battery mounting portion 200 may have a shape that is recessed more than its periphery to accommodate the battery 210 on a surface of the rear case 102. The battery mounting portion 200 may include a first end surface 202, a second end surface 203 and a face 204 extending between the first end surface 202 and the second end surface 203 of the battery mounting portion 200.

A detachable battery cover 230 may be provided to cover the battery 210 and an opening of the battery mounting portion 200 when the battery is mounted in the battery mounting portion 200. The battery cover 230 and the battery 210 may be separate, as illustrated in FIG. 4 and referred to as a built-in type, or may be integrated with the battery 210, which is not shown and is referred to as an external pack type. The battery cover 230 may include at least one locking tab 231 to facilitate the battery cover being detachably coupled to a rear surface of the terminal body. The locking tab 231 may be formed in various shapes according to the material of the battery cover 230 and an opening or closing direction of the battery cover. As depicted in FIG. 4, in one embodiment the battery cover 230 is placed in a closed state when pressed in a horizontal direction (parallel to a rear surface of the terminal body) and the closed state can be released if pulled out in the opposite direction. For example, the battery cover 230 may placed in the closed state when moved in the direction away from the second end surface 203 of the battery mounting portion 200 of the mobile terminal and toward the first end surface 202 of the battery mounting portion of the mobile terminal.

The position of a battery connecting device 240 for electrically coupling the battery 210 to the mobile terminal 100 may be determined based on which direction the battery 210 is inserted into the battery mounting portion 200 or the relation with a circuit board provided in the mobile terminal. The battery connecting device 240 may include a conductive flexible terminal 250 made of, for example, a conductive metallic material. The flexibility and shape of the flexible terminal 250 facilitates contact between the flexible terminal and a contact pad 221 (FIG. 5) of the battery 210.

The terminal body includes battery movement limiting members to limit movement of the battery 210 to help avoid the loss of electrical coupling between the battery and the terminal body when the mobile terminal 100 is exposed to shock forces, such as from being dropped. One component of the battery movement limiting members is the battery mounting portion 200. In one embodiment, the battery mounting portion 200 has a substantially rectangular shaped pocket substantially corresponding to the shape of the battery 210 to limit the movement of the battery 210 in a longitudinal direction toward either the first side surface 202 or the second side surface 203 of the battery mounting portion, or in a lateral direction traverse to the longitudinal direction. The terminal body also includes at least one tab 201 projecting from an edge of the mounting portion 200 away from the face 204 of the mounting portion. For example, the at least one tab 201 may project from the first end surface 202 of the battery mounting portion 200 toward the second end surface 203 of the battery mounting portion.

The battery 210 includes a first end surface 215, a second end surface 216 and a face 217 positioned between the first end surface and the second end surface. When mounted into the battery mounting portion 200 of the mobile terminal 100, the first end surface 215 of the battery corresponds to the first end surface 202 of the battery mounting portion 200, the second end surface 216 of the battery corresponds to the second end surface 203 of the battery mounting portion 200, and the face 217 of the battery corresponds to the face 204 of the battery mounting portion 200. The battery 210 includes at least one notch 211 corresponding to the at least one tab 201 projecting from the edge of the battery mounting portion 200 of the mobile terminal 100.

The battery 210 may be inserted into the battery mounting portion 200 of the mobile terminal 100 in a direction from the second end surface 203 of the battery mounting portion toward the first end surface 202 of the battery mounting portion. In this manner, when the battery 210 is mounted within the battery mounting portion 200, longitudinal and lateral movement of the battery 210 is limited by the first end surface 202, second end surface 203, first side surface 205 and second side surface 206 of the battery mounting portion 200 of the mobile terminal 100. Additionally, movement of the battery 210 toward the face 204 of the battery mounting portion 210 is limited by the face 217 of the battery itself, and movement away from the face 204 of the battery mounting portion 210 is limited by the at least one tab 201 of the terminal body and the at least one notch 211 of the battery 210.

The battery 210 continuously receives a bias force from the flexible terminal 250 when mounted in the battery mounting portion 200. As will be described, the flexible terminal 250 is configured to maintain electrical coupling between the battery 210 and the terminal body of the mobile terminal 100 when a shock force is applied to the battery 210 or the terminal body to avoid a change in the contacting state between the battery and the flexible terminal.

Figure 5:
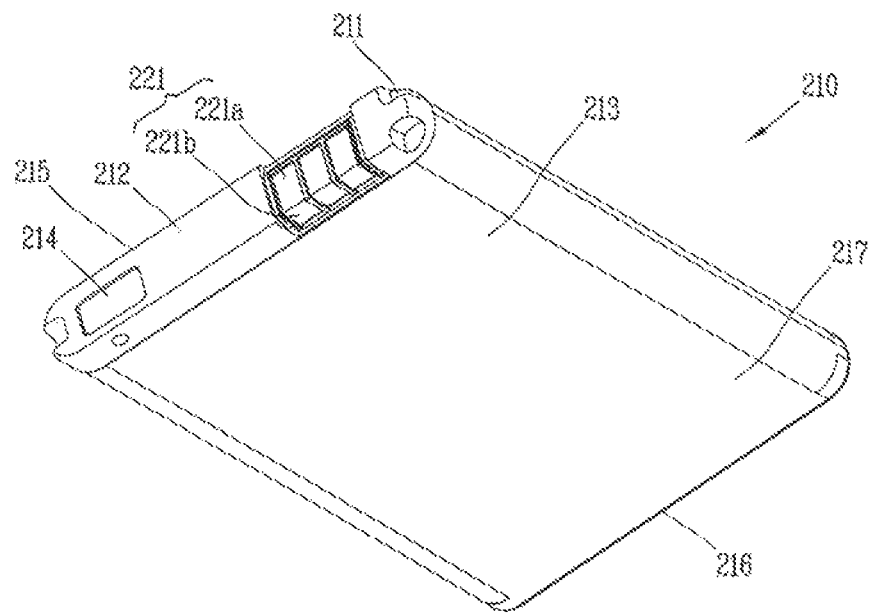
FIG. 5 is a perspective view illustrating a terminal of the battery according to an embodiment of the present invention.

FIG. 5 is a perspective view illustrating a terminal of the battery according to an embodiment of the present invention. As illustrated in FIG. 5, the battery 210 is provided with a case 213 including a cell therein. A molding portion 212 in which a structure associated with the connection of the battery 210 and a protection circuit of the cell are integrated is provided at a side of the case 213, such as at the first end surface 215 of the battery 210. A contact pad 221 for connecting to the flexible terminal 250 (FIG. 4) is provided at a side of the molding portion 212. A plurality of contact pads 221 insulated from one another may be provided based on the manufacturer's standard. The contact pads 221 may be positioned in recesses in the surface of the battery 210 to avoid a short-circuit with an external conductor.

Referring to FIG. 5, each contact pad 221 may include a first pad portion 221b positioned proximate the face 217 of the battery 210 and a second pad portion 221a positioned proximate the first end surface 215 of the battery. In other words, the structure facilitates each contact pad 221 being connected to a corresponding flexible terminal 250 by the first pad portion 221b and the second pad portion 221a, thereby providing a more stable power supply connection in comparison to terminals where only one contact pad portion is provided for each contact pad.

A pressure relief member 214 is provided to relieve the pressure when excessive pressure develops within the cell. The pressure relief member 214 may be configured to rupture or dissect when excessive pressure develops, thereby preventing the battery 210 from exploding due to a sudden increase in pressure.

Figure 6:
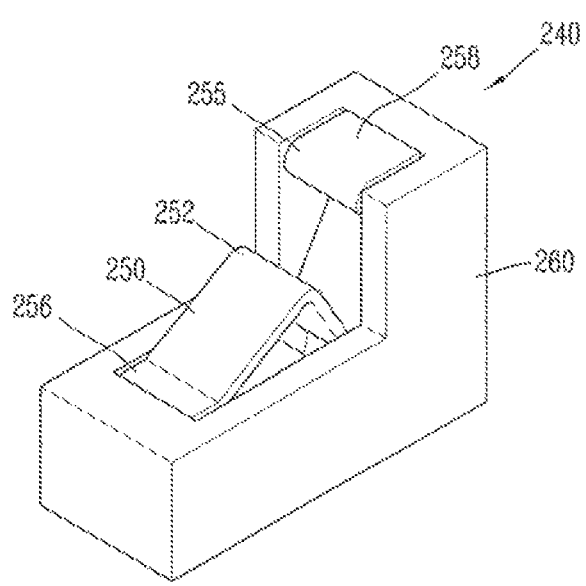
FIG. 6 is a perspective view illustrating a battery connecting device according to an embodiment of the present invention.
Figure 7:
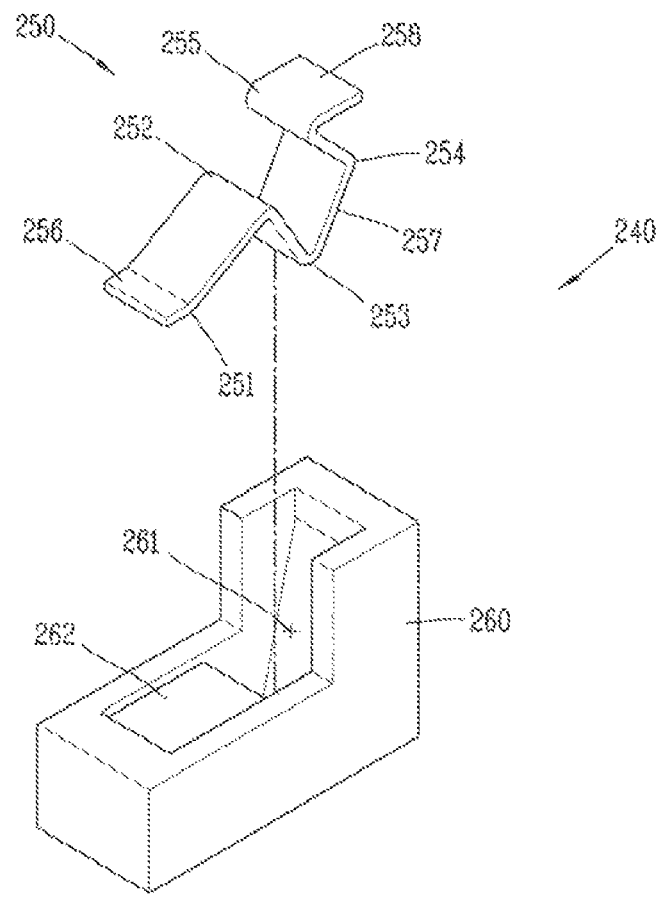
FIG. 7 is a perspective view illustrating the battery connecting device of FIG. 6 separated into a flexible terminal and an insulation mount.
Figure 8:
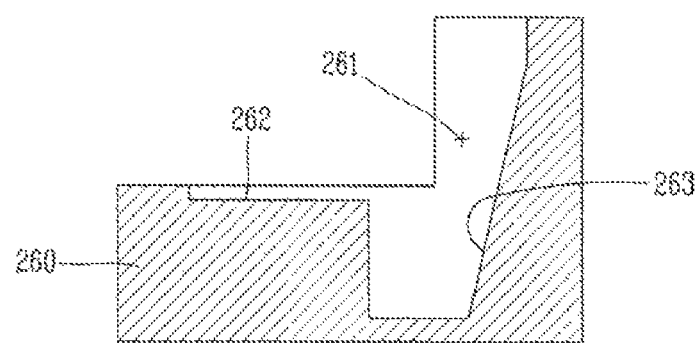
FIG. 8 is a cross-sectional view illustrating the insulation mount of FIG. 6.
Figure 9:
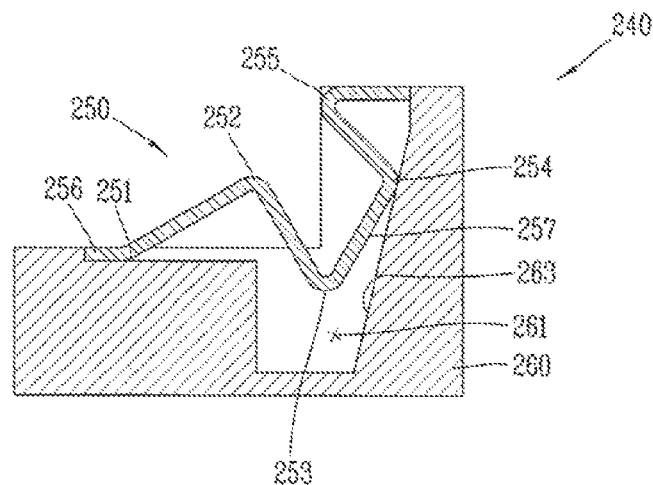
FIG. 9 is a cross-sectional view illustrating the battery connecting device of FIG. 6.

FIG. 6 is a perspective view illustrating an example of a battery connecting device 240 according to an embodiment of the present invention. FIG. 7 is a perspective view illustrating the battery connecting device 240 of FIG. 6 separated into a flexible terminal 250 and an insulation mount 260. FIG. 8 is a cross-sectional view illustrating the insulation mount 260 of FIG. 6. FIG. 9 is a cross-sectional view illustrating the battery connecting device 240 of FIG. 6.

As illustrated in FIG. 6, the battery connecting device 240 may include a flexible terminal 250, which may be made of an electrically conductive metal, and an insulation mount 260 that supports the flexible terminal 250. The flexible terminal 250 may be electrically coupled to a circuit board (not shown) or similar component provided in the terminal body, such as via surface mounting or connectors.

The flexible terminal 250 may be made of a long, flat band and may include a first contact portion 252 and a second contact portion 255. The first contact portion 252 of the flexible terminal 250 is configured to be biased to contact the first pad portion 221b of the battery 210 and the second contact portion 255 of the flexible terminal 250 is configured to be biased to contact the second pad portion 221a of the battery 210. The flexible terminal 250 also includes a first end portion 256 positioned proximate the first contact portion 252 and a second end portion 258 positioned proximate the second contact portion 255.

One of the first end portion 256 or the second end portion 258 of the flexible terminal 250 is coupled to the insulation mount 260 and the other end of the flexible terminal 250 is free. For example, the first end portion 256 of the flexible terminal 250 may fixed to the insulation mount 260, and formed such that contact pressure of the second contact portion 255 of the flexible terminal 250 against the second pad portion 221a of the battery increases when force is applied to the first contact portion 252 of the flexible terminal 250 in a direction away from the first pad portion 221b of the battery 210.

The first end portion 256 of the flexible terminal 250 may be fixed to the insulation mount 260 via insertion, bonding, molding, or other method that is well known in the art, while the second end portion 258 of the flexible terminal is free and not fixed to the insulation mount. In one embodiment, the first end portion 256 of the flexible terminal 250 is fixed to a groove 262 (FIGS. 7 and 8) of the insulation mount 260 and the flexible terminal 250 may include an initial bending portion 251 (FIG. 7) to facilitate applying a bias contact force to the contact pad 221 of the battery 210. The first contact portion 252 and the second contact portion 255 of the flexible terminal 250 may be pressed and deformed by the contact pad 221 on the battery 210 when the battery 210 is mounted in the mounting portion 200 of the terminal body.

The insulation mount 260 may include a receiving groove 261 to facilitate the deformation of the flexible terminal 250 caused by the battery. The receiving groove 261 of the insulation mount 260 receives a connecting portion 257 of the flexible terminal 250 that connects the first contact portion 252 and the second contact portion 255.

When the battery 210 is not mounted in the mounting portion 200 of the terminal body, the flexible terminal 250 is merely fixed to the insulation mount 260 and may be configured to not receive any force from the receiving groove 261. However, during mounting of the battery 210 into the mounting portion 200, the connecting portion 257 of the flexible terminal 250 that connects the first contact portion 252 and the second contact portion 255 of the flexible terminal is deformed in the receiving groove 261.

The connecting portion 257 has a predetermined shape that facilitates bending in a direction that causes the second contact portion 255 of the flexible terminal 250 to be brought into contact with the second pad portion 221a of the battery 210 during mounting of the battery 210 into the mounting portion 200 of the terminal body. Referring to FIGS. 7 and 9, the connecting portion 257 includes a first bending portion 253 and a second bending portion 254. The first bending portion 253 is formed to have an acute angle in a pre-deformed state, and the second bending portion 254 is formed to have an obtuse angle in the pre-deformed state. The first bending portion 253 is configured such that the acute angle thereof decreases during mounting of the battery 210, and the second bending portion 254 is configured such that the obtuse angle thereof increases during mounting the battery.

The receiving groove 261 provides sufficient space to not obstruct the deformation or movement of the connecting portion 257 of the flexible terminal 250 while receiving the connecting portion 257 of the flexible terminal 250 when no external forces are applied. The receiving groove 261 includes an angled inner wall that forms a contact surface 263 that is configured to be contacted by the second bending portion 254 of the flexible terminal 250. The second bending portion 254 of the flexible terminal 250 is configured to move along the angled inner wall during mounting of the battery into the mobile terminal, which causes the acute angle of the first bending portion 253 to decrease during mounting of the battery 210 into the mounting portion 200.

Figure 10:
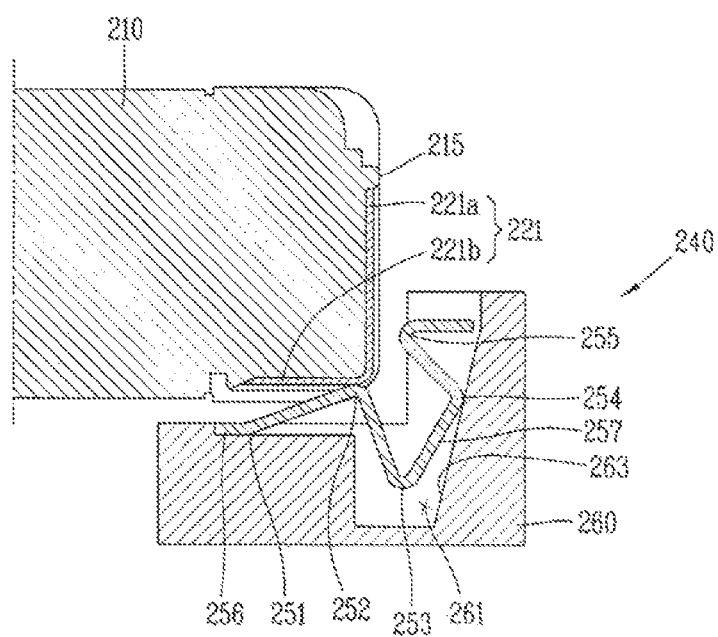
FIG. 10 is a cross-sectional view illustrating a state where a contact portion of the battery begins to contact the flexible terminal during mounting of the battery into the mobile terminal.
Figure 11:
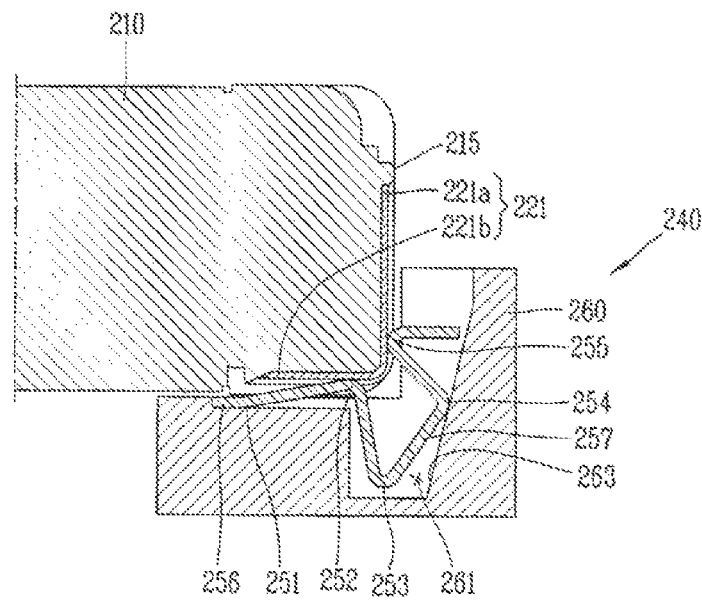
FIG. 11 is a cross-sectional view illustrating a state where the contact portion of the battery is completely brought into contact with the flexible terminal.
Figure 12:
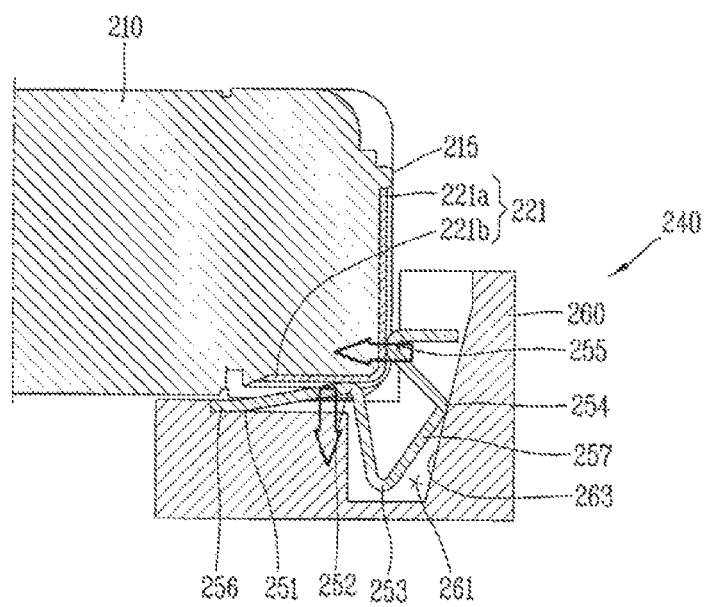
FIG. 12 is an operational state view conceptually illustrating forces applied to a contact portion of the flexible terminal when an external shock is applied in a direction of the contact portion when the battery is mounted thereon.
Figure 12:
Figure 13:
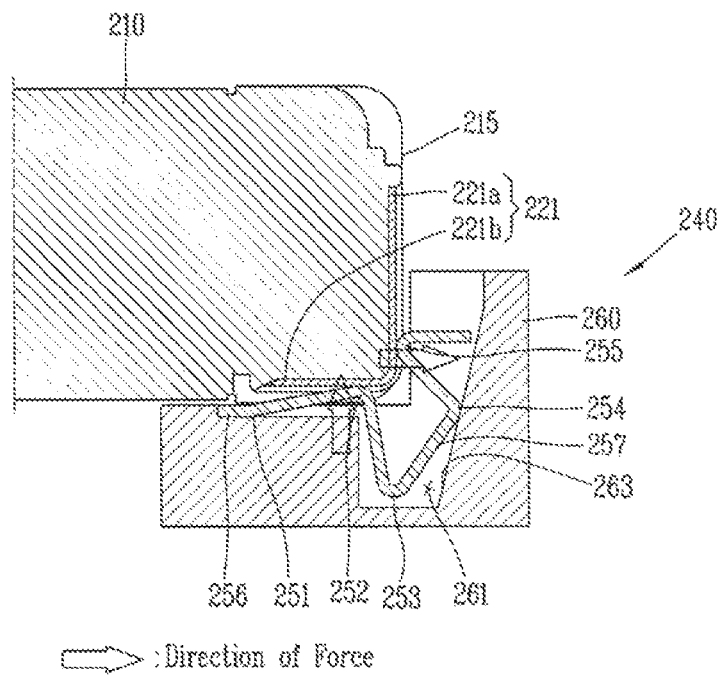
FIG. 13 is an operational state view conceptually illustrating forces applied to a different contact portion of the flexible terminal when an external shock is applied in direction of the different contact portion when the battery is mounted thereon.

The operation of the battery connecting device 240 having the flexible terminal 250 and insulation mount 260 will be described with reference to FIGS. 10 through 13. FIG. 10 is a cross-sectional view illustrating a state where a contact pad 221 of the battery begins to contact the flexible terminal 250 during mounting of the battery into the mounting portion 200 of the terminal body. FIG. 11 is a cross-sectional view illustrating a state where the contact pad 221 of the battery is completely brought into contact with the flexible terminal 250 during mounting of the battery into the mounting portion 200 of the terminal body. FIG. 12 is an operational state view conceptually illustrating forces applied to the flexible terminal 250 when an external shock is applied in a direction of the first contact portion 252 when the battery is mounted thereon. FIG. 13 is an operational state view conceptually illustrating forces applied to the flexible terminal 250 when an external shock is applied in a direction of the second contact portion 255 when the battery 210 is mounted thereon.

As illustrated in FIG. 10, the battery 210 may be inserted into the battery mounting portion 200 in a horizontal direction, such as toward the first end surface 202 of the battery mounting portion 200. During this process, the contact pad 221 of the battery 210 presses the first contact portion 252 of the flexible terminal 250 slightly. When the first contact portion 252 of the flexible terminal 250 is pressed, the connecting portion 257 and the second contact portion 255 are deformed slightly in a clockwise direction around the fixed end portion 256. Then, the second bending portion 254 of the flexible terminal 250 slides along the contact surface 263 of the insulation mount 260, thereby causing the second contact portion 255 of the flexible terminal 250 to move into contact with the second pad portion 221a of the battery 210 due to the slant of the contact surface 263.

When the battery 210 is completely mounted in the mounting portion 200 of the terminal body, with the first pad portion 221b of the battery applying a force to the first contact portion 252 of the flexible terminal 250, the second contact portion 255 of the flexible terminal is forced into contact with the second pad portion 221a, thereby maintaining an electrically coupled state between the battery and the terminal body. The first contact portion 252 of the flexible terminal 250 continues to maintain a state of contact with the first pad portion 221b of the battery 210 while the battery is mounted in the mounting portion 200 of the terminal body.

With the battery 210 mounted in the mounting portion 200 of the terminal body, side surfaces of the mounting portion, including the first end surface 202, the second end surface 203, the first side surface 205 and the second side surface 206, limit movement of the battery away from the second contact portion 255 of the flexible terminal 250. With the first end surface 215 of the battery 210 positioned between the at least one tab 201 projecting from an edge of the first end surface 202 of the mounting portion 200 and the face 204 of the mounting portion, movement of the first end surface 215 of the battery away from the face 204 of the mounting portion is limited, thereby limiting movement of the battery away from the first contact portion 252 of the flexible terminal 250. Accordingly, the flexible terminal 250 constantly provides elastic bias force to the contact pad 221, thereby maintaining the battery 210 in an electrically coupled state with the terminal body.

FIG. 12 depicts an external force, such as from an external shock, being applied to the first contact portion 252 of the flexible terminal 250 in a direction away from the first pad portion 221b of the battery 210. The force may cause the flexible terminal 250 to deform sufficiently to cause the first contact portion 252 of the flexible terminal to be separated from the a first pad portion 221b of the battery 210. However, the second bending portion 254 of the connecting portion 257 of the flexible terminal 250 moves along the angled wall forming the contact surface 263, which causes the contact pressure of the second contact portion 255 of the flexible terminal 250 against the second pad portion 221a of the battery to increase. Accordingly, the risk of electrical decoupling at the first contact portion 252 may be alleviated by the second contact portion 255 strongly pressing the second pad portion 221a.

Conversely, when an external force, such as from an external shock, is applied to the second contact portion 255 of the flexible terminal 250 in a direction away from the second pad portion 221a of the battery 210, as illustrated in FIG. 13, the force may cause the flexible terminal 250 to deform sufficiently to cause the second contact portion 255 of the flexible terminal to be separated from the a second pad portion 221a of the battery. However, a force in an opposite direction to the force applied to the second contact portion 255 is exerted by using the second bending portion 254 as a point of action, thereby applying a force by a lever action in a clockwise rotating direction about the second bending portion 254. This rotational action causes the first contact portion 252 of the flexible terminal 250 to move toward the first pad portion 221b of the battery 210, thereby increasing the contact pressure of the first contact portion 252 against the first pad portion 221b. Accordingly, the risk of electrical decoupling at the second contact portion 255 may be alleviated by the first contact portion 252 strongly pressing the first pad portion 221b.

Figure 14:
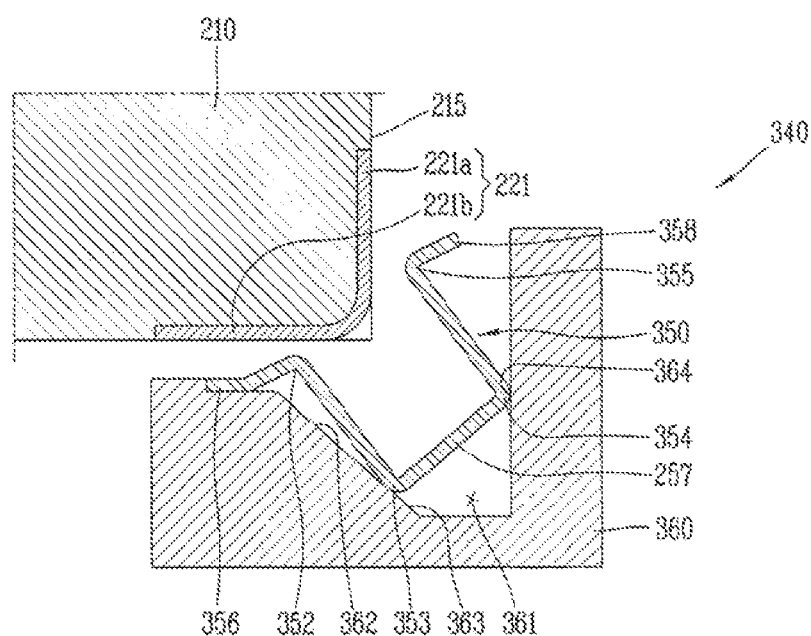
FIG. 14 is a cross-sectional view illustrating another example of a battery connecting device according to an embodiment of the present invention.
Figure 15:
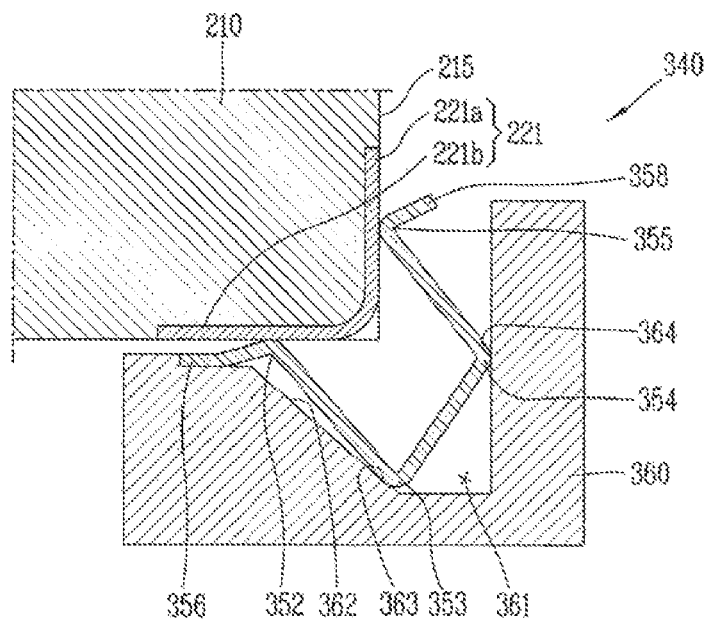
FIG. 15 is a cross-sectional view illustrating the battery completely mounted on the battery connecting device of FIG. 14.

FIG. 14 is a cross-sectional view illustrating another example of a connecting device of the battery according to an embodiment of the present invention, and FIG. 15 is a cross-sectional view illustrating the battery completely mounted on the battery connecting device of FIG. 14. In this example, a flexible terminal 350 has a different shape from the flexible terminal 250 illustrated in FIGS. 7-13, and the shape of a receiving groove 361 of the insulation mount 360 is also slightly different from the receiving groove 261 illustrated in FIGS. 7-13. However, the flexible terminal 350 is similar to the flexible terminal 250 in that a first end portion 356 of the flexible terminal 350 is fixed to the receiving groove 361 and a second end portion 358 of the flexible terminal is free.

Referring to FIG. 14, the space between a first contact portion 352 and a second contact portion 355 of the flexible terminal 350 may include a first bending portion 353 proximate the first contact portion 352 and a second bending portion 354 proximate the second contact portion 355. An inner wall of the receiving groove 361 may include a first contact surface 363, which is configured to contact the first bending portion 353, and a second contact surface 364, which is configured to contact the second bending portion 354. The angle between the first contact surface 363 and the second contact surface 364 is an acute angle.

When the battery 210 is mounted in the battery mounting portion 200, the first pad portion 221b of the battery is brought into contact with the first contact portion 352 of the flexible terminal 350 and applies force on the first contact portion 352 in a direction toward the face 204 of the mounting portion. When the force is applied on the first contact portion 352, the first bending portion 353 is moved in a downward and rightward direction along the first contact surface 363 of the receiving groove 361. When the second bending portion 354 of the flexible terminal 350 is brought into contact with the second contact surface 364 of the receiving groove 361, the second contact portion 355 provides a bias force toward the second pad portion 221a of the battery 210 that causes the contact force of the second contact portion 355 against the second pad portion 221a of the battery 210 to increase. As a result, both the first contact portion 352 and the second contact portion 355 can maintain a strong contact force against the contact pad 221 of the battery 210.

When an external force, such as from an external shock, is applied in a direction toward the second contact portion 355 of the flexible terminal 350, the contact force of the first contact portion 352 of the flexible terminal 350 against the first pad portion 221b of the battery 210 increases. Conversely, when an external force, such as from an external shock, is applied in a direction toward the first contact portion 352 of the flexible terminal, the contact force of the second contact portion 355 of the flexible terminal 350 against the first pad portion 221b of the battery 210 increases.

Figure 16:
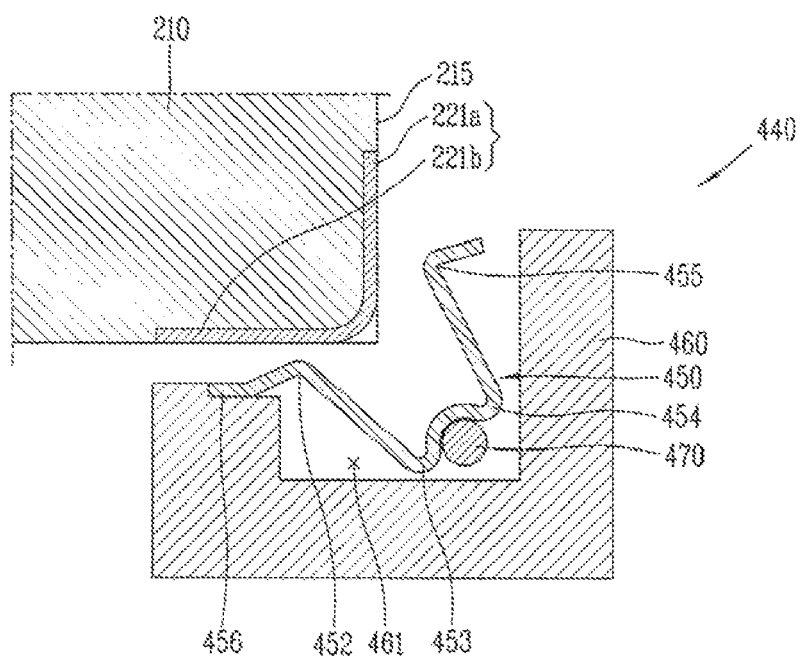
FIG. 16 a cross-sectional view illustrating still another example of a battery connecting device according to an embodiment of the present invention.
Figure 17:
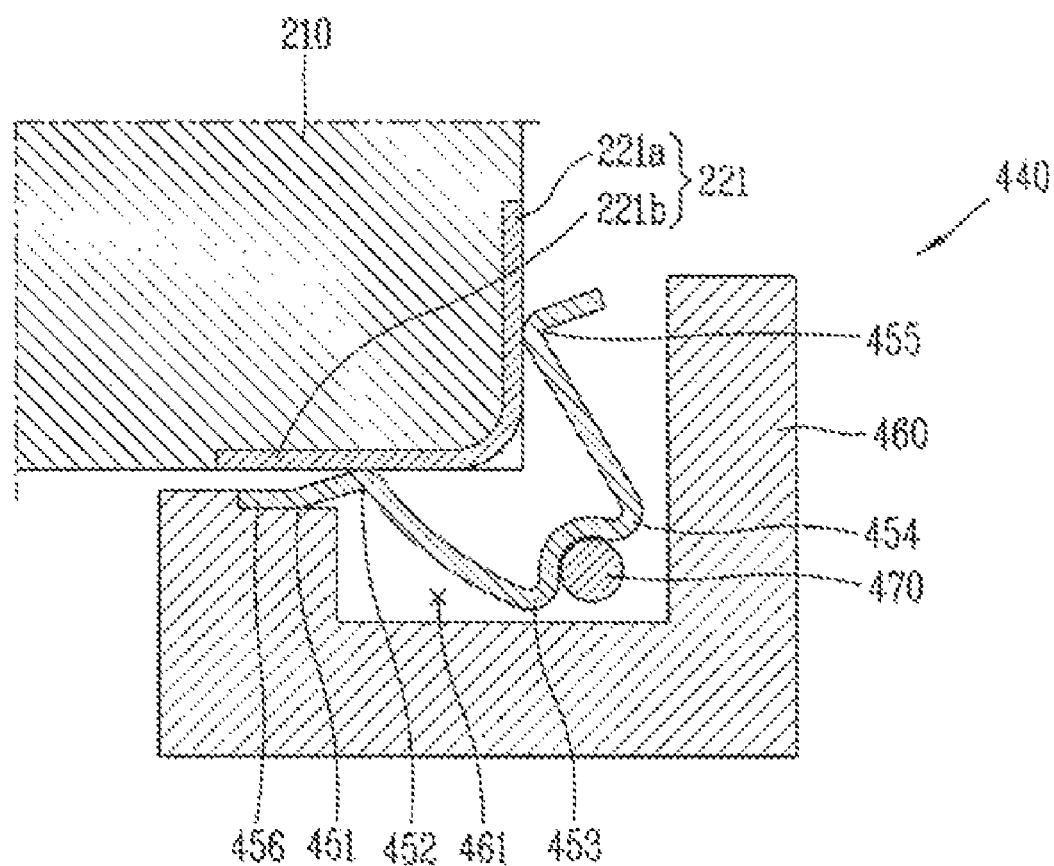
FIG. 17 is a cross-sectional view illustrating the battery completely mounted on the battery connecting device of FIG. 16.

FIG. 16 is a cross-sectional view illustrating still another example of a connecting device of the battery, and FIG. 17 is a cross-sectional view illustrating the battery completely mounted on the battery connecting device of FIG. 16. In this example, a flexible terminal 450 has a different shape from the flexible terminals 250 and 350 illustrated in FIGS. 7-15, and the shape of a receiving groove 461 of the insulation mount 460 is also different from the receiving grooves 261 and 361 illustrated in FIGS. 7-15. FIGS. 16 and 17 depict a supporting member 470 that is provided to allow the flexible terminal 450 to rotate about the supporting member inside the receiving groove 461.

The space between a first contact portion 452 and a second contact portion 455 of the flexible terminal 450 may include a first bending portion 453 positioned proximate the first contact portion 452 and a second bending portion 454 positioned proximate the second contact portion 455. A section between the first bending portion 453 and the second bending portion 454 is rotatably supported by the supporting member 470. The supporting member 470 has a longitudinal configuration and extends across the receiving groove 461 of the insulation mount 460.

As an example, a surface of the supporting member 470 configured to contact and support the flexible terminal 450 has a curved convex cross section, such as a circumferential arced cross section, and the section of the flexible terminal 450 that is configured to contact and be supported by the supporting member has a curved concave cross section, such as a circumferential arced cross section. During mounting of the battery 210 into the battery mounting portion 200, neither the first bending portion 453 nor the second bending portion 454 is brought into contact with an inner wall of the receiving groove 461.

When the battery 210 is mounted in the battery mounting portion 200, the first pad portion 221b of the battery is brought into contact with the first contact portion 452 of the flexible terminal 450 and applies a force on the first contact portion 452 in a direction toward the face 204 of the battery mounting portion. The force on the first contact portion 452 causes the second bending portion 454 to rotate about the supporting member 470 in a counterclockwise direction, as depicted in FIGS. 16 and 17, thereby causing the second contact portion 455 to move toward contact with the second pad portion 221a of the battery 210. Accordingly, the second contact portion 455 can provide a bias force toward the second pad portion 221a of the battery 210 that causes the contact force of the second contact portion 455 against the second pad portion 221a of the battery 210 to increase. As a result, both the first contact portion 452 and the second contact portion 455 can maintain a strong contact force against the contact pad 221 of the battery 210.

When an external force, such as from an external shock, is applied in a direction toward the second contact portion 455 of the flexible terminal 450, the contact force of the first contact portion 452 of the flexible terminal 450 against the first pad portion 221b of the battery 210 increases. Conversely, when an external force, such as from an external shock, is applied in a direction toward the first contact portion 452 of the flexible terminal 450, the contact force of the second contact portion 455 of the flexible terminal 450 against the second pad portion 221a of the battery 210 increases.

As described herein, according to a mobile terminal associated with the present invention, when any one contact portion of a flexible terminal moves in a direction away from a pad portion of the battery, a bias force of another contact portion of the flexible terminal against a corresponding pad portion of the battery increases. Accordingly a stable electrical coupling between the battery and the terminal body is maintained regardless of the direction of a shock force to the mobile terminal.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal, comprising:
a battery for providing power to the mobile terminal, the battery comprising:
  a face positioned between a first end surface and a second end surface of the battery; and
  at least one contact pad, each of the at least one contact pad having a first pad portion positioned proximate the face of the battery and a second pad portion positioned proximate the first end surface of the battery;
a connecting device configured for electrically coupling the battery to a terminal body of the mobile terminal when the battery is mounted in the mobile terminal, the connecting device comprising:
  at least one electrically conductive flexible terminal, each of the at least one flexible terminal comprising a first contact portion proximate a first end and biased to contact the first pad portion of the at least one contact pad of the battery and a second contact portion proximate a second end and biased to contact the second pad portion of the at least one contact pad of the battery; and
  an insulation mount configured to support the at least one flexible terminal,
wherein either the first end or the second end of each of the at least one flexible terminal is coupled to the insulation mount of the connecting device and the other of either the first end or second end of each of the at least one flexible terminal is free,
wherein each of the at least one flexible terminal is configured to increase contact pressure of the first contact portion against the first pad portion of the at least one contact pad of the battery when force is applied to the second contact portion in a direction away from the second pad portion of the at least one contact pad of the battery, and
wherein each of the at least one flexible terminal is configured to increase contact pressure of the second contact portion against the second pad portion of the at least one contact pad of the battery when force is applied to the first contact portion in a direction away from the first pad portion of the at least one contact pad of the battery.

2. The mobile terminal of claim 1, wherein:
the flexible terminal further comprises a connecting portion connecting the first contact portion and the second contact portion; and
the insulation mount comprises a receiving groove for receiving the connecting portion of the flexible terminal.

3. The mobile terminal of claim 2, wherein the connecting portion of the flexible terminal includes at least one bending portion configured to force the second contact portion into contact with the second pad portion of the at least one contact pad of the battery when force is applied to the first contact portion by the first pad portion of the at least one contact pad of the battery during mounting of the battery in the mobile terminal.

4. The mobile terminal of claim 3, wherein:
the at least one bending portion of the connecting portion comprises a first bending portion formed to have an acute angle and a second bending portion formed to have an obtuse angle;
the first bending portion is configured such that the acute angle of the first bending portion decreases during mounting of the battery in the mobile terminal; and
the second bending portion is configured such that the obtuse angle of the second bending portion increases during mounting of the battery in the mobile terminal.

5. The mobile terminal of claim 4, wherein:
the receiving groove of the insulation mount includes an angled inner wall forming a contact surface configured to be contacted by the second bending portion of the flexible terminal; and
the second bending portion of the flexible terminal is configured to move along the angled inner wall of the receiving groove during mounting of the battery in the mobile terminal to decrease the acute angle of the first bending portion.

6. The mobile terminal of claim 3, wherein:
the bending portion of the connecting portion comprises a first bending portion positioned proximate the first contact portion and a second bending portion positioned proximate the second contact portion;
the first bending portion is configured such that an angle of the first bending portion decreases during mounting of the battery in the mobile terminal; and
the second bending portion is configured such that an angle of the second bending portion increases during mounting of the battery into the mobile terminal.

7. The mobile terminal of claim 6, wherein:
the receiving groove of the insulation mount includes a first angled inner wall forming a first contact surface configured to be contacted by the first bending portion of the flexible terminal and a second angled inner wall forming a second contact surface configured to be contacted by the second bending portion of the flexible terminal;
an angle between the first angled inner wall and the second angled inner wall is an acute angle;
the first bending portion of the connecting portion is configured to move along the first angled inner wall of the receiving groove during mounting of the battery in the mobile terminal; and
the second bending portion of the connecting portion is configured to move along the second angled inner wall of the receiving groove during mounting of the battery in the mobile terminal.

8. The mobile terminal of claim 3, wherein:
the connecting device further comprises a longitudinal supporting member extending across the receiving groove of the insulation mount;
the at least one bending portion of the connecting portion comprises a first bending portion positioned proximate the first contact portion and a second bending portion positioned proximate the second contact portion; and
a section of the flexible terminal between the first bending portion and second bending portion is configured to contact and be supported by the supporting member.

9. The mobile terminal of claim 8, wherein:
a surface of the supporting member configured to contact and support the section of the flexible terminal between the first bending portion and the second bending portion has a curved convex cross section; and
the section of the flexible terminal between the first bending portion and the second bending portion configured to contact and be supported by the supporting member has a curved concave cross section and is configured to rotate about the supporting member.

10. The mobile terminal of claim 2, wherein the flexible terminal is configured to contact an inner wall of the receiving groove at least at one position during mounting of the battery in the mobile terminal.

11. A mobile terminal, comprising:
a battery configured to provide power to the mobile terminal, the battery comprising:
a face positioned between a first end surface and a second end surface of the battery; and
at least one contact pad, each of the at least one contact pad having a first pad portion positioned proximate the face of the battery and a second pad portion positioned proximate the first end surface of the battery;
a terminal body having a mounting portion for detachably receiving the battery, the mounting portion comprising:
a first end surface configured to be positioned proximate the first end surface of the battery when the battery is mounted in the mounting portion;
a second end surface configured to be positioned proximate the second end surface of the battery when the battery is mounted in the mounting portion; and
a face configured to be positioned proximate the face of the battery when the battery is mounted in the mounting portion; and
a connecting device positioned within the mounting portion of the terminal body proximate the first end surface of the mounting portion and configured for electrically coupling the battery to the terminal body when the battery is mounted in the mounting portion, the connecting device comprising:
at least one electrically conductive flexible terminal, each of the at least one flexible terminal comprising a first contact portion proximate a first end and biased to contact the first pad portion of the at least one contact pad of the battery when the battery is positioned in the mounting portion and a second contact portion proximate a second end and biased to contact the second pad portion of the at least one contact pad of the battery when the battery is mounted in the mounting portion; and
an insulation mount configured to support the at least one flexible terminal,
wherein either the first end or the second end of each of the at least one flexible terminal is coupled to the insulation mount of the connecting device and the other of either the first end or second end of each of the at least one flexible terminal is free,
wherein each of the at least one flexible terminal is configured to increase contact pressure of the first contact portion against the first pad portion of the at least one contact pad of the battery when force is applied to the second contact portion in a direction toward the first end surface of the mounting portion, and
wherein each of the at least one flexible terminal is configured to increase contact pressure of the second contact portion against the second pad portion of the at least one contact pad of the battery when force is applied to the first contact portion in a direction toward the face of the mounting portion.

12. The mobile terminal of claim 11, wherein:
the flexible terminal further comprises a connecting portion connecting the first contact portion and the second contact portion; and
the insulation mount comprises a receiving groove for receiving the connecting portion of the flexible terminal.

13. The mobile terminal of claim 12, wherein the connecting portion of the flexible terminal includes at least one bending portion configured to force the second contact portion into contact with the second pad portion of the at least one contact pad of the battery when force is applied to the first contact portion by the first pad portion of the at least one contact pad of the battery during mounting of the battery in the mounting portion of the terminal body.

14. The mobile terminal of claim 13, wherein:
the at least one bending portion of the connecting portion comprises a first bending portion formed to have an acute angle and a second bending portion formed to have an obtuse angle;
the first bending portion is configured such that the acute angle of the first bending portion decreases during mounting of the battery in the mounting portion; and
the second bending portion is configured such that the obtuse angle of the second bending portion increases during mounting of the battery in the mounting portion.

15. The mobile terminal of claim 14, wherein:
the receiving groove of the insulation mount includes an angled inner wall forming a contact surface configured to be contacted by the second bending portion of the flexible terminal; and
the second bending portion of the flexible terminal is configured to move along the angled inner wall of the receiving groove during mounting of the battery in the mounting portion to decrease the acute angle of the first bending portion.

16. The mobile terminal of claim 13, wherein:
the bending portion of the connecting portion comprises a first bending portion positioned proximate the first contact portion and a second bending portion positioned proximate the second contact portion;
the first bending portion is configured such that an angle of the first bending portion decreases during mounting of the battery in the mounting portion; and
the second bending portion is configured such that an angle of the second bending portion increases during mounting of the battery into the mounting portion.

17. The mobile terminal of claim 16, wherein:
the receiving groove of the insulation mount includes a first angled inner wall forming a first contact surface configured to be contacted by the first bending portion of the flexible terminal and a second angled inner wall forming a second contact surface configured to be contacted by the second bending portion of the flexible terminal;
an angle between the first angled inner wall and the second angled inner wall is an acute angle;
the first bending portion of the connecting portion is configured to move along the first angled inner wall of the receiving groove during mounting of the battery in the mounting portion; and
the second bending portion of the connecting portion is configured to move along the second angled inner wall of the receiving groove during mounting of the battery in the mounting portion.

18. The mobile terminal of claim 13, wherein:
the connecting device further comprises a longitudinal supporting member positioned within the receiving groove of the insulation mount, the supporting member extending parallel to the first end surface of the mounting portion and the face of the mounting portion;
the at least one bending portion of the connecting portion comprises a first bending portion positioned proximate the first contact portion and a second bending portion positioned proximate the second contact portion; and
a section of the flexible terminal between the first bending portion and second bending portion is configured to contact and be supported by the supporting member.

19. The mobile terminal of claim 18, wherein:
a surface of the supporting member configured to contact and support the section of the flexible terminal between the first bending portion and the second bending portion has a curved convex cross section; and
the section of the flexible terminal between the first bending portion and the second bending portion configured to contact and be supported by the supporting member has a curved concave cross section and is configured to rotate about the supporting member.

20. The mobile terminal of claim 11, wherein the first end surface of the battery and the second end surface of the battery are perpendicular to each other.

21. The mobile terminal of claim 20, wherein:
the terminal body further comprises at least one tab projecting from an edge of the first end surface of the mounting portion away from the face of the mounting portion; and
at least a portion of the first end surface of the battery is positioned between the at least one tab and the face of the mounting portion when the battery is mounted in the mounting portion; and
the at least one tab is configured to limit movement of the battery away from the face of the mounting portion.

22. The mobile terminal of claim 12, wherein the flexible terminal is configured to contact an inner wall of the receiving groove at least at one position during mounting of the battery in the mounting portion of the terminal body.

* * * * *